United States Patent [19]

Komoda et al.

[11] Patent Number: 5,402,292
[45] Date of Patent: Mar. 28, 1995

[54] MAGNETORESISTANCE EFFECT TYPE THIN FILM MAGNETIC HEAD USING HIGH CEOERCION FILMS

[75] Inventors: Tomohisa Komoda; Ryoji Minakata, both of Nara; Tohru Kira, Tenri; Akiyoshi Fujii, Nara; Hiroshi Suzuki, Nara; Atsuo Mukai, Nara, all of Japan

[73] Assignee: Sharp Kabushiki Kaisha, Osaka, Japan

[21] Appl. No.: 951,985

[22] Filed: Sep. 25, 1992

[30] Foreign Application Priority Data

Sep. 27, 1991 [JP] Japan .................. 3-249089
Mar. 11, 1992 [JP] Japan .................. 4-052521
Sep. 7, 1992 [JP] Japan .................. 4-238472

[51] Int. Cl.⁶ .................. G11B 5/39; G11B 5/31; G11B 5/187
[52] U.S. Cl. .................. 360/113; 360/126; 360/122
[58] Field of Search .................. 360/113, 126, 122

[56] References Cited

U.S. PATENT DOCUMENTS

| | | | |
|---|---|---|---|
| 3,887,944 | 6/1975 | Bajorek et al. | 300/113 |
| 4,639,806 | 1/1987 | Kira et al. | 360/113 |
| 4,814,918 | 3/1989 | Somers | 360/113 |
| 4,814,919 | 3/1989 | Kitada et al. | 360/113 |
| 5,021,909 | 6/1991 | Shiiba | 360/113 |
| 5,155,642 | 10/1992 | Voegeli | 360/113 |

FOREIGN PATENT DOCUMENTS

| | | | |
|---|---|---|---|
| 0467457 | 1/1992 | European Pat. Off. | |
| 58-57618 | 4/1983 | Japan . | |
| 58-100216 | 6/1983 | Japan . | |
| 59-87615 | 5/1984 | Japan . | |
| 60-018812 | 1/1985 | Japan . | |
| 60-59518 | 4/1985 | Japan . | |
| 60-119618 | 6/1985 | Japan . | |
| 61-71407 | 4/1986 | Japan | 360/113 |
| 61-296522 | 12/1986 | Japan | 360/113 |
| 62-137713 | 6/1987 | Japan | 360/113 |
| 63-091818 | 4/1988 | Japan . | |
| 63-304416 | 12/1988 | Japan | 360/113 |
| 64-1114 | 1/1989 | Japan . | |
| 3-144908 | 6/1991 | Japan | 360/113 |
| 3-248310 | 11/1991 | Japan | 360/113 |
| 2146482 | 4/1985 | United Kingdom . | |

OTHER PUBLICATIONS

Patent Abstracts of Japan, vol. 11, No. 362, (P-640) (2809) Nov. 26, 1987 of JP-A-62 137 713 (Victor Co. of Japan, Ltd.) Jun. 20, 1987.
L. T. Romankiw, IBM Technical Disclosure Bulletin, vol. 20, No. 2, Jul. 1977, Armonk, N.Y., U.S. pp. 791-793.
Joint Meeting promoted by Kansai Branch Offices of Electricity Related Society, S37, 1988.
"Barkhausen Noise in Yoke Type MR Head" Institute of Electronics, Information and Communication Engineers of Japan, MR86-37, 1986.

*Primary Examiner*—Stuart S. Levy
*Assistant Examiner*—Craig A. Renner
*Attorney, Agent, or Firm*—David G. Conlin; Robert F. O'Connell; Kevin J. Fournier

[57] ABSTRACT

A magnetoresistance effect type thin film magnetic head includes a MR element having the electrical resistance changed according to a change in an applied signal magnetic field, a lead electrode for detecting a voltage change generated across the ends of the MR element in which a change in electrical resistance is generated, and high coercive force films for applying a weak magnetic field to the MR element. The high coercive force films are arranged in the proximity of the ends of the MR element and at a predetermined position between the ends. According to this structure, a weak magnetic field is applied in uniform over the entire MR element to facilitate unification of magnetic domain of the MR element even in the case of a long MR element. Therefore, unification of magnetic domain can easily be carried out over the entire region of the MR element without increasing the film thickness of the high coercive force film even in a case of a wide track width, resulting in a thin film magnetic head with no Barkhausen noise generation.

5 Claims, 13 Drawing Sheets

MAGNETORESISTANCE EFFECT TYPE THIN FILM MAGNETIC HEAD USING HIGH CEOERCION FILMS

BACKGROUND OF THE INVENTION

1. Field of the Invention

The present invention relates to a magnetoresistance effect type thin film magnetic head (referred to as "thin film MR head" hereinafter) including a magnetoresistive element (referred to as "MR element" hereinafter) having its electrical resistance changed according to a change in an applied signal magnetic field for detecting a change in the signal magnetic field recorded on a magnetic recording medium, and more particularly, to an improvement of a structure of a thin film MR head for reducing Barkhausen noise.

2. Description of the Background Art

It is known that a thin film MR head has many advantages in comparison with a coil type bulk magnetic head. A thin film MR head responses to magnetic flux by receiving a signal magnetic field recorded on a magnetic recording medium such as a magnetic tape and changes its internal resistance according to the change in the direction of magnetization within a magnetoresistive element. Therefore, the value of signal is independent of the speed of the magnetic recording medium. This thin MR head is expected to have a great potential as a reproduction magnetic head for a fixed head type PCM (Pulse Code Modulation) recorder in which high density recording is carried out by virtue of high integration density and multi-element easily obtained by the manufacturing technique of a semiconductor.

From the fact that an MR element indicates a quadratic curve with respect to an external magnetic field, it is necessary to arrange the element configuration in stripes to make sure of stability of the MR element. In order to obtain linear response of the MR element as well, bias magnetic field to the MR element is needed.

FIG. 8 shows a perspective view of a conventional thin film MR head in the proximity of an MR element. Referring to FIG. 8, a conventional thin film MR head includes an MR element 1, a lead electrode 2 connected to the ends of the MR element 1, and a bias electrode 3 located beneath the MR element 1 for applying a bias magnetic field to the MR element 1. In this thin film MR head, the magnetic field exerted from the end of a gap (arrow A) is applied to the MR element 1, whereby the MR element 1 is magnetized.

The reproduction output of the MR element reflects the magnetization of the MR element 1. The MR element 1 is arranged such that the input direction of a magnetic field is in the direction of the hard magnetizing axis. In the ideal case where the magnetization direction of the MR element 1 is moved in a rotation mode, My (magnetization in the direction of the y axis in FIG. 8) takes the linear function of Hy (magnetic field in the y direction), and the output of the MR element 1 changes in a quadratic functional manner with respect to the input magnetic field. FIG. 9A shows the relationship between an input magnetic field and a MR element output in an ideal case where there is no noise. The output of the MR element 1 is saturated according to the saturation of My in a high magnetic field.

Although the ideal MR element output is as described above, a change in My occurs not only in a rotation mode in an actual MR element. Magnetic domain disintegration occurs in the MR element to cause displacement of the magnetic domain. Particularly when the track width of the MR element is reduced, a change in My becomes significant by displacement of magnetic domain on account of magnetostatic energy. Displacement of magnetic domain causes a discontinuous change in My called Barkhausen jump (referred to as "B-jump" hereinafter). The relationship between the MR element output and input magnetic field is shown in FIG. 9B where there is a mixture of the abovedescribed rotation mode and displacement of magnetic domain. The B-jump results in noise in the reproduced output to degrade greatly the S/N ratio of the MR head. It is indispensable to suppress the B-jump in a MR element to obtain a superior MR head.

It is conventionally known to establish a state of single magnetic domain for the MR element by applying a weak magnetic field, of several oersted in the direction of easy magnetizing axis of the MR element in order to suppress the B-jump.

A thin film magnetic head employing such a MR element includes a yoke type shown in FIG. 10 and a shield type shown in FIG. 11. Referring to FIG. 10, a yoke type thin film magnetic head includes a lower yoke 4 forming a magnetic path, an upper yoke 5 divided into two in the front and back direction, and a MR element 1 and a bias electrode 3 arranged between the upper yoke 5 and the lower yoke 5. There is an insulating layer 6 therebetween for insulating the MR element 1 and the bias electrode 3. Here, the "front and back direction" denotes the horizontal direction in FIG. 10 where the left side is the front and the right side is the back. The magnetic flux generated from a magnetic recording medium 7 is introduced through the gap portion 8 in the front end portion of upper and lower yokes 5 and 4 into a magnetic circuit formed of the upper yoke 5 and the lower yoke 5. More specifically, the magnetic flux flows from the disconnected portion of the upper front yoke 5a to pass through the MR element 1, and then reenters the upper yoke 5 from the disconnected portion of the upper back yoke 5b. The magnetic flux passes through the lower yoke 4 to return to the magnetic recording medium 7. The lower yoke 4 also serves as the substrate of the thin film magnetic head, and is formed of a soft magnetic material such as ferrite.

A shield type thin film magnetic head shown in FIG. 11 includes a MR element 1, a lead wire 2, and a bias electrode 3 between a pair of upper and lower high permeability magnetic substances 9a and 9b with an insulating layer 10 therebetween. The shield thin film magnetic head has the magnetic field generated from the magnetic recording medium 7 directly applied to the MR element 1.

In comparing the above-described two types of thin film magnetic heads employing MR elements, it is known that the yoke type is advantageous than the shield type from the standpoint of improving resolution of a signal and the lifetime of a MR element.

For carrying out unification of magnetic domain of a MR element, the method shown in FIG. 12 where a MR element 1 is magnetically shielded, or the method of applying a weak magnetic field in one direction to the MR element are known. Regarding the method of applying a weak magnetic field to a MR element, there is one method wherein magnetic films with high coercive force are formed at the ends of a MR element and magnetized in the longitudinal direction of the MR element. These magnetic films make a weak magnetic field to the MR element because of its residual magnetization in the same direction as they are magnetized. This method is already proposed in Japanese Patent Laying-Open No. 60-59518 filed by the applicant of the present application. The MR element disclosed therein has a conductor portion 2 formed at the end portions of the MR element 1 with high coercive force films 11 thereunder as shown in FIG. 14 in contrary to the structure shown in FIG. 13 of a MR element in conventional thin film magnetic heads of FIGS. 10 and 11.

The Japanese Patent Laying-Open No. 60-59518 discloses the shield type thin film magnetic head shown in FIGS. 15A and 15B as an embodiment employing such a MR element.

The reference characters in FIGS. 15A and 15B are equivalent to those of FIGS. 11 and 14. Therefore, detailed description of the structure and operation thereof will not be repeated.

As the material of each high coercive force film 11, an electroless Co-P plated film is used by virtue of its easy formation process.

According to a single magnetic domain theory, a ferromagnetic thin film unified in magnetic domain has a "jump" generated due to magnetization switching in the magnetization curve when the angle of the easy magnetizing axis with respect to a signal magnetic field exceeds a right angle by a certain angle. Because there is anisotropic dispersion in the magnetic anisotropy of a ferromagnetic thin film such as Ni-Fe implementing a MR device, the easy magnetizing axis is inclined within a range of angle with respect to a specified direction of easy magnetizing axis. Therefore, the characteristic of the MR element has this "jump" in various positions with respect to the applied magnetic field. Because this "jump" caused by switching results in switching noise, it is necessary to move the "jump" to the side of the non-operating point of the magnetic head. A method of forming the easy magnetizing axis of a MR device inclined at a predetermined angle with respect to the longitudinal direction of the MR element is known for this purpose taking into consideration the anisotropic dispersion of the MR element. (Refer to Komoda, Minakata, Joint Meeting promoted by Kansai Branch Offices of Electricity Related Society, S37, 1988.)

A MR head having a high coercive force film 11 arranged at both ends of a MR element can be applied to not only a shield type but also to a yoke type. The structure of a yoke type thin film magnetic head having high coercive force films 11 formed at the ends of a MR element is shown in FIGS. 16A and 16B. The reference characters of FIGS. 16A and 16B correspond to those of FIGS. 10 and 14 so that the details of the structure and operation will not be repeated.

The above-described high coercive force film carries out unification of magnetic domain of a MR element to suppress Barkhausen noise by applying a weak magnetic field to a MR element. However, because the intensity of the magnetic field of the high coercive force film decreases according to the distance from the high coercive force film, there will be almost no magnetic field by the high coercive force film applied in the center of the MR element if the length of the MR element is increased in the direction of the track width. Therefore, unification of magnetic domain is carried out easily when the length of the MR element is small. However if the MR element is long, there is a possibility of the unification of magnetic domain not thoroughly carried out resulting in the generation of a magnetic domain wall. Therefore, the output curve of the MR element is as shown in FIG. 9C, resulting in a problem of Barkhausen noise generation.

In the case of a yoke type, the state of magnetic domain becomes unstable due to the increase in the yoke length in the direction of the track width, leading to a possibility of an unstable magnetization change appearing discontinuously as a change in resistance of the MR element.

If the track width is increased to obtain a great output signal, a greater magnetic field formed by the high coercive force film is required, so that the film thickness of the high coercive force film 11 must be accordingly increased. For example, an analog signal reproduction track width is approximately 600 $\mu$m of a DCC (Digital Compact Cassette) for reproducing an analog signal of a compact cassette. With the structure shown in FIGS. 16A and 16B, the length of the MR element 1 is increased if the width of the yoke is great for sufficiently introducing a signal from a magnetic tape, resulting in a greater distance between the high coercive force films 11 formed at both ends of the MR element 1. The intensity of the magnetic field is inversely proportional to a square of the distance between the magnetic substances. Therefore, the volume of the high coercive force film 11 must be quadrupled to form a magnetic field of the same intensity when the distance is doubled.

In the method of manufacturing a thin film magnetic head, increasing the film thickness of the high coercive force film 11 is typical to increase the volume thereof. If the film thickness is increased, the distance between the MR element 1 and the conductor 2 will also be increased. As a result, the electrical resistance across the MR element 1 and the conductor 2 is increased due to the increase in film thickness of the high coercive force film 11 to provide an unstable output value or the problem of disconnection. Furthermore, in the case of a thin film magnetic head of multitracks, the resistance of the MR element will vary for each track to reduce the production yield. This also gave a disadvantage of difficulty in adjusting the signal processing circuit.

SUMMARY OF THE INVENTION

An object of the present invention is to provide a magnetoresistance effect type thin-film magnetic head that can facilitate unification of magnetic domain in a MR element to prevent generation of Barkhausen noise without increasing the thickness of a coercive force film even in the case of a wide track width.

The magnetoresistance effect type thin film magnetic head of the present invention includes a MR element having the electrical resistance changed according to a change in the magnetic field of an applied signal, a lead electrode for conducting a sense current flow across the ends of the MR element to detect change in voltage across the ends, and high coercive force films for carrying out unification of magnetic domain of the MR element by applying a weak magnetic field to the MR element. The high coercive force films are arranged in the proximity of both ends of the MR element, and at one or more predetermined positions between the proximity of the ends.

According to this structure, unification of magnetic domain of a MR element can be carried out easily because a weak magnetic field is applied substantially in uniform over the entire region of the MR element in the longitudinal direction even in the case of a long MR element due to a wide track width. Therefore, the generation of Barkhausen noise is suppressed at the time of operation of the thin film magnetic head to prevent decrease in the yield of a thin film magnetic head caused by Barkhausen noise.

According to a preferable embodiment of the present invention, a yoke for forming a magnetic circuit for introducing a magnetic flux generated from a magnetic recording medium to the MR element is further included in addition to the above-described structure.

By including a yoke, the resolution of a signal of the thin film magnetic head and also the lifetime of the MR element are improved.

According to a further preferable embodiment of the present invention, the yoke includes a flat-plate-shaped lower yoke, and an upper yoke located above the lower yoke to form a magnetic circuit with the lower yoke to introduce magnetic flux from the magnetic recording medium. The upper yoke is divided in the track width direction in the proximity of the high coercive force film.

By the upper yoke being divided in the direction of the track width, generation of a magnetic field in the upper yoke in a direction opposite to the weak magnetic field applied to the MR element from the high coercive force films is prevented in the proximity of each high coercive force film. Therefore, generation of a magnetic domain wall which is the cause of Barkhausen noise is suppressed to further improve the characteristics and yield as a thin film magnetic head.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

The first embodiment of the present invention will be described hereinafter with reference to FIGS. 1A, 1B, and 2.

Figure 1A:
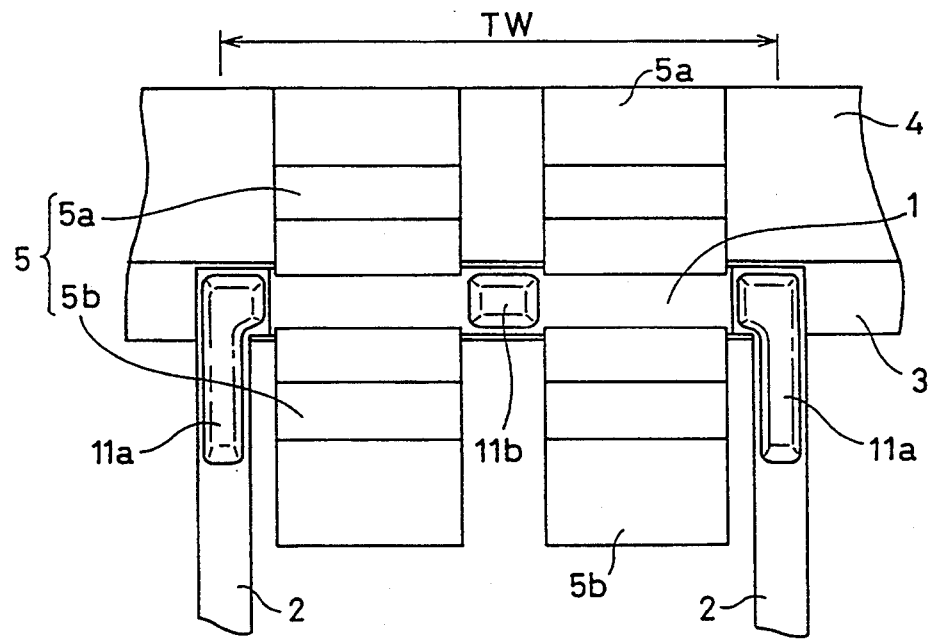
FIGS. 1A and 1B are a plan view and a perspective view, respectively, of a thin film magnetic head according to a first embodiment of the present invention.
Figure 1B:
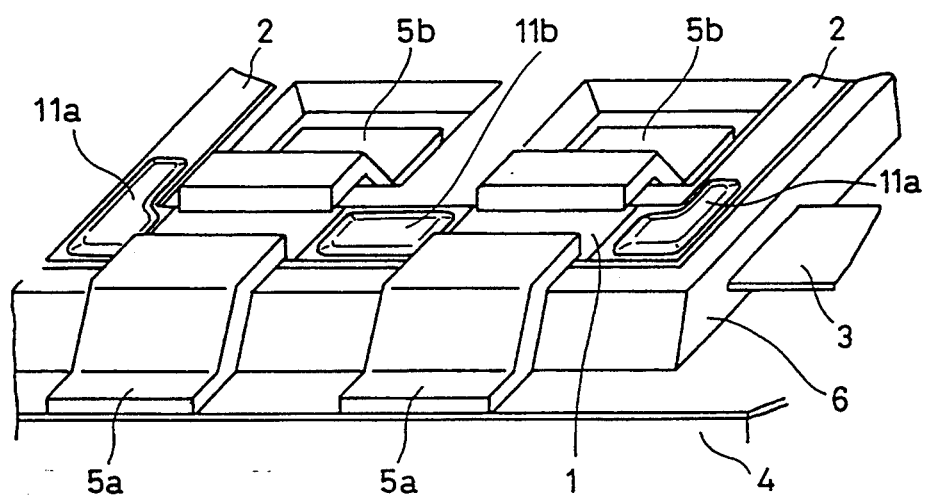
Figure 2:
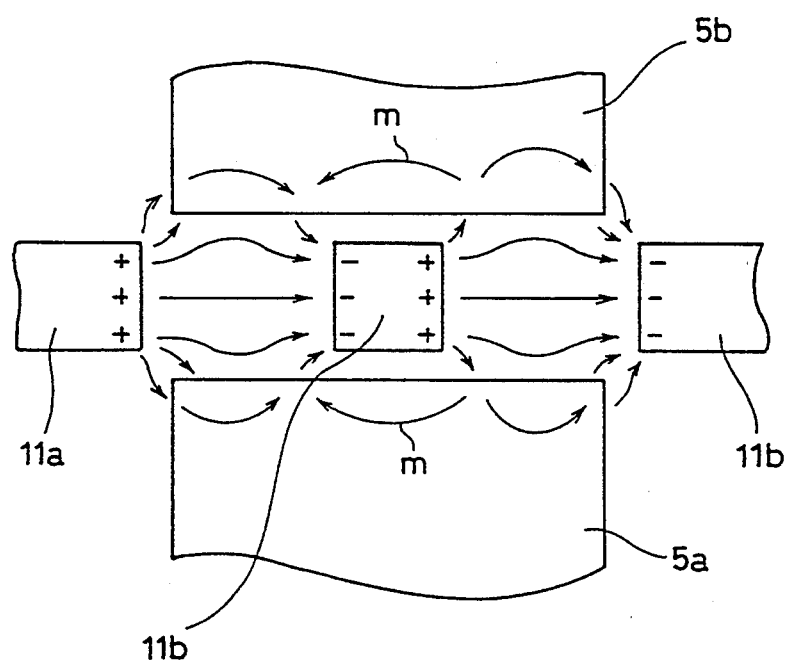
FIG. 2 is a diagram for describing the problems where an upper yoke 5 is not divided in the direction of the track width.

The present embodiment is an application of the present invention to a yoke type thin film magnetic head, where FIG. 1A shows a plan view and FIG. 1B shows a perspective view. Referring to FIGS. 1A and 1B, an upper yoke 5 is provided above a lower yoke 4 serving as a substrate. The upper yoke 5 is divided into a left portion and a right portion (in the direction of the track width) in the proximity of the center. TW in FIG. 1A represents the width of a track.

A pair of high coercive force films 11a are formed in the proximity of the ends of a MR element 1 in the track width direction. A high coercive force film 11b is formed in the center portion of the MR element 1 where the upper yoke 5 is divided into two. One pair of lead electrodes 2 connected to the ends of the MR element 1 conducts a sense current flow to the MR element 1 to detect a voltage change across the ends to convey a signal to a signal processing circuit. An electrode for bias 3 is formed beneath the MR element 1. A bias magnetic field is applied to the MR element by conducting a predetermined current flow to the bias electrode 3.

The reason why the upper yoke 5 is divided into two and a high coercive force film 11b is formed at that position will be described hereinafter with reference to FIG. 2. If a high coercive force film 11b is formed in the middle of the upper yoke 5 not divided into a left portion and the right portion on the MR element 1, a magnetic flux in a horizontal direction as shown by arrow m is generated in the upper yoke 5 in the proximity of the high coercive force film 11b. Because the upper yoke 5 is generally formed of a soft magnetic material such as permalloy, such a change in the direction of magnetic flux will induce a possibility of an new magnetic domain wall being generated at that portion. This means that there is a possibility of Barkhausen noise being generated as a result of the magnetic domain wall in the yoke. An approach is considered to increase the distance between the upper yoke and the high coercive force film 11b, or to reduce the area of the high coercive force film 11b to avoid such a problem. However, this approach will cause problems that the magnetic field input from the upper yoke 5 will not reach the MR element 1 or the weak magnetic field applied to the MR element 1 from the high coercive force film 11b is insufficient. Thus, the upper yoke 5 is divided in the proximity of the high coercive force film 11b as in the present embodiment.

Figure 16A:
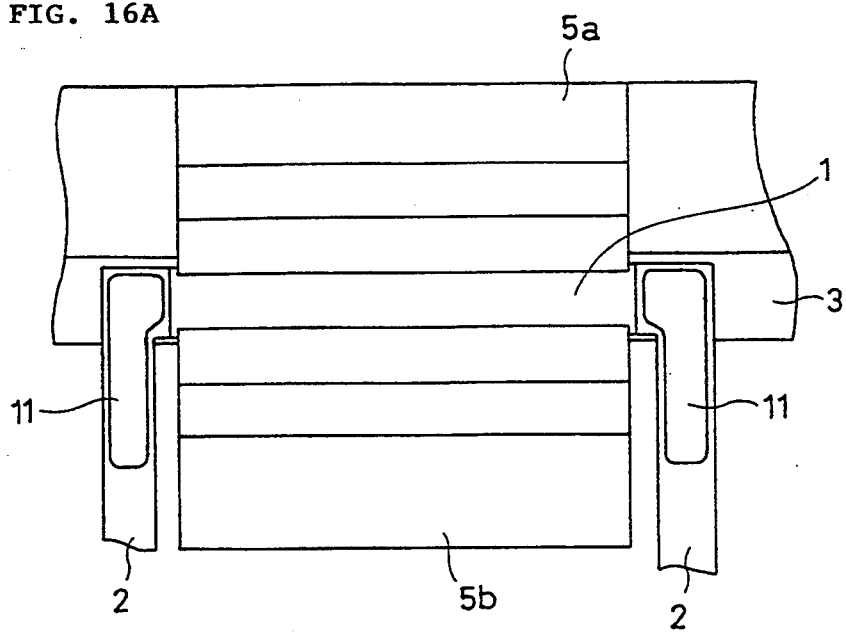
FIGS. 16A and 16B are a plan view and a perspective view, respectively, of a conventional yoke type thin film magnetic head having a high coercive force film formed only in the proximity of both ends of a MR element.
Figure 16B:
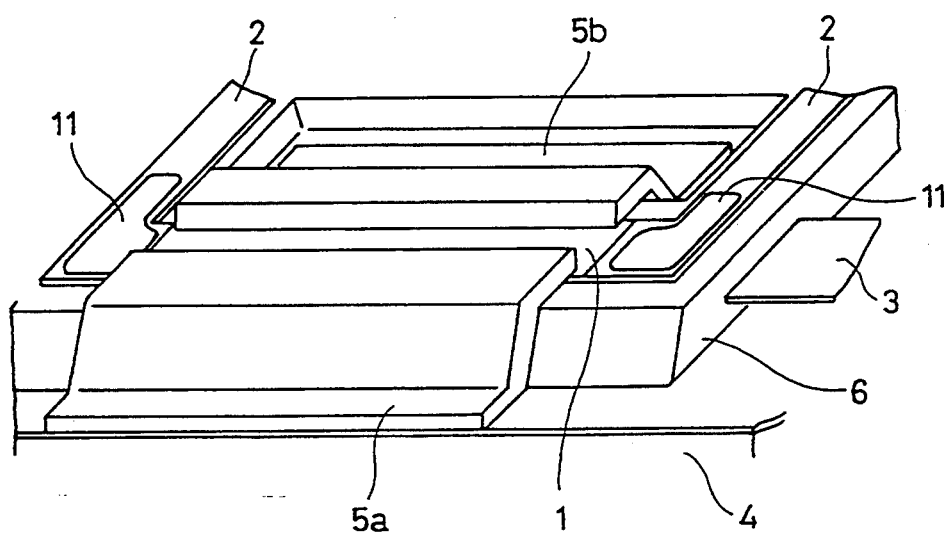

According to the structure of the present embodiment, a more uniform weak magnetic field can be applied over the entire region of the MR element 1 even in the case of a long MR element 1 in comparison with a conventional yoke type thin film magnetic head shown in FIGS. 16A and 16B. Therefore, unification of magnetic domain of the MR element 1 is facilitated to realize a magnetoresistance effect type thin film magnetic head having a large track width and no Barkhausen noise.

Figure 3A:
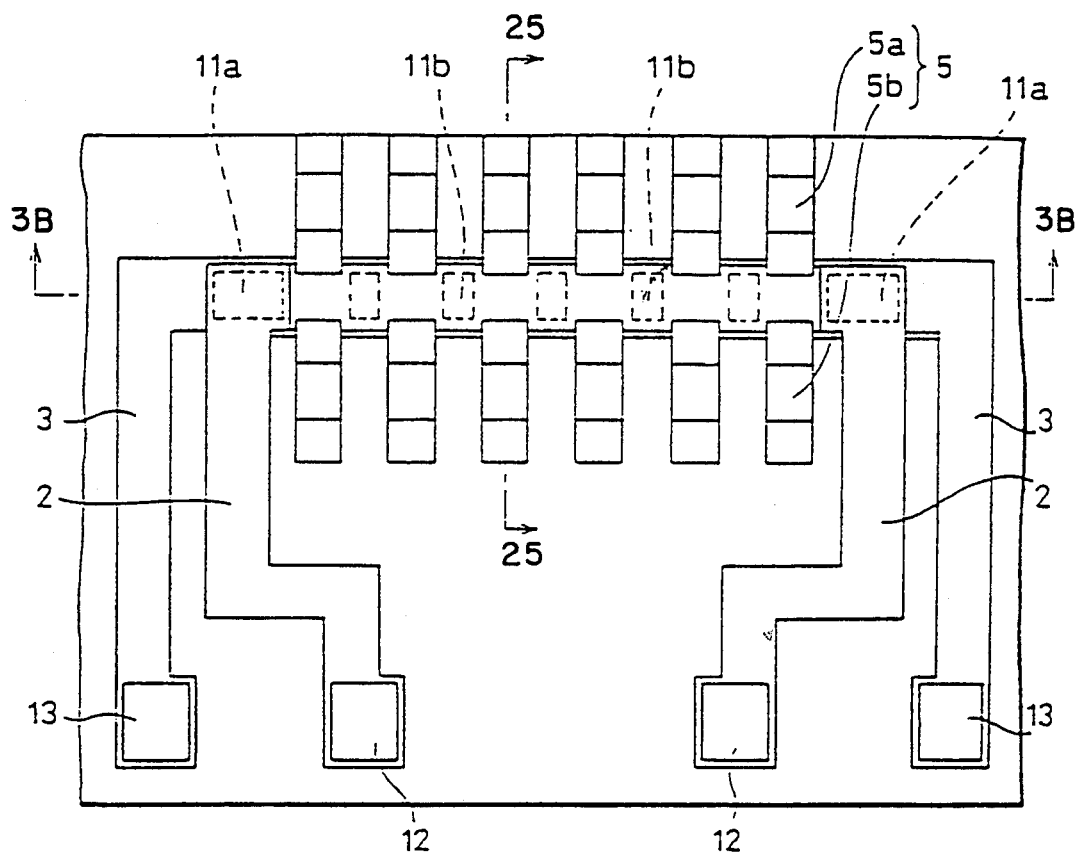
FIG. 3A is a plan view of a thin film magnetic head according to a second embodiment of the present invention.
Figure 3B:
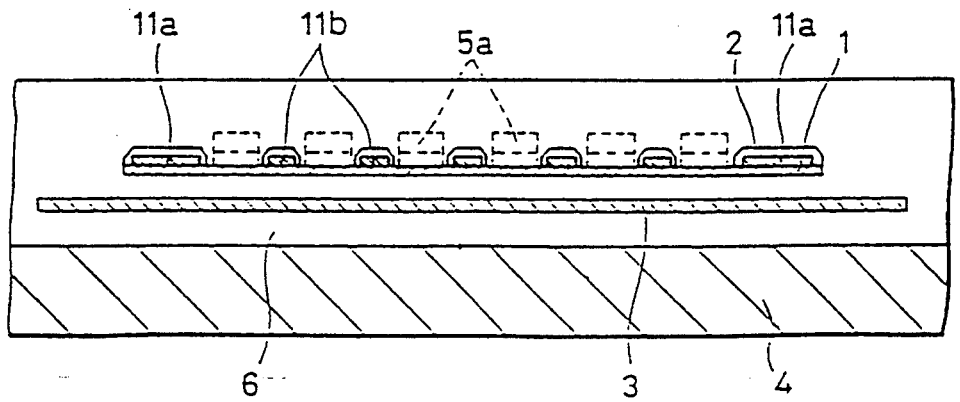
FIG. 3B is a sectional diagram taking along line 3B—3B of FIG. 3A.
Figure 4:
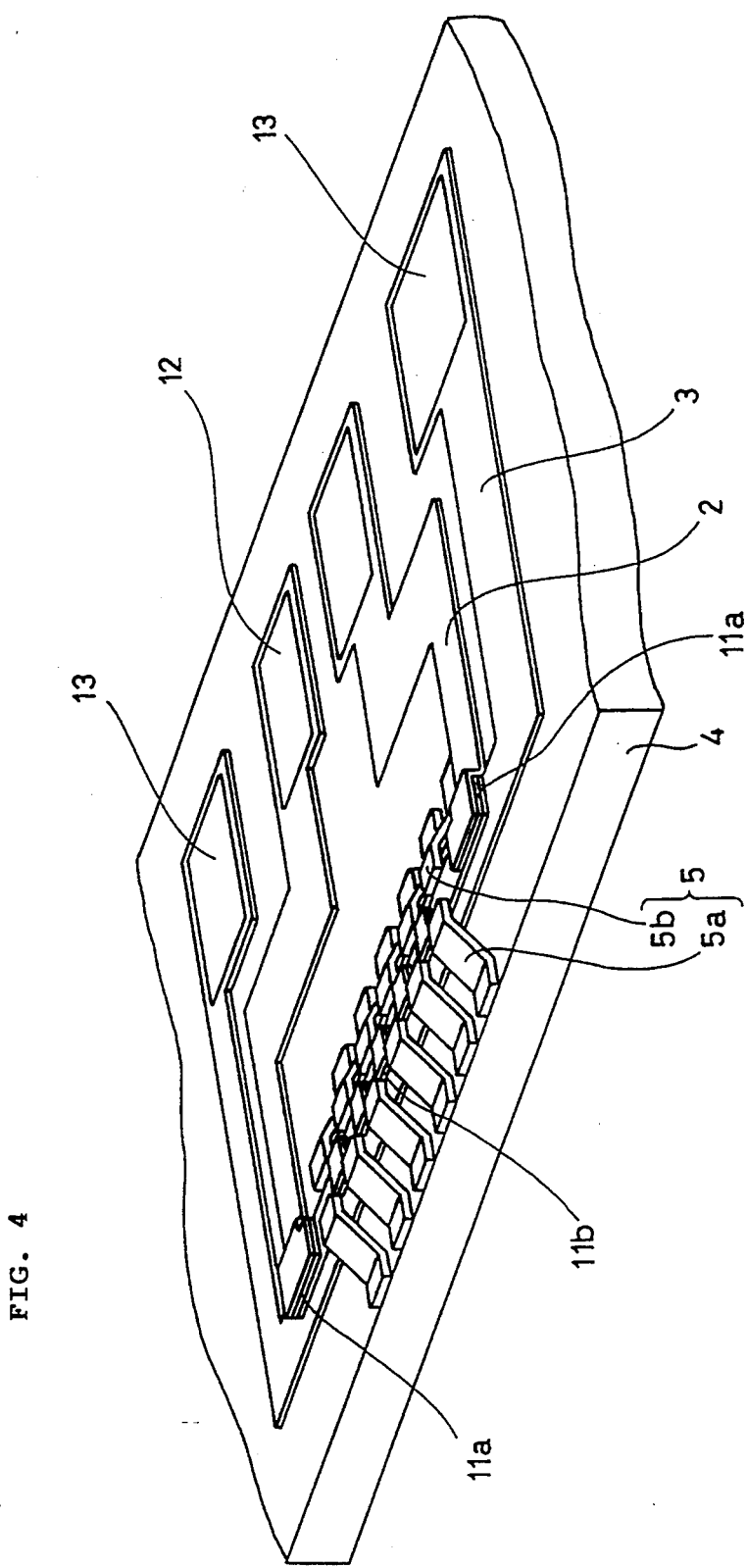
FIG. 4 is a perspective view of the thin film magnetic head according to a second embodiment of the present invention.

A second embodiment of the present invention will be described hereinafter with reference to FIGS. 3A, 3B, and 4. The present embodiment is similar to the abovedescribed first embodiment where the present invention is applied to a yoke type thin film magnetic head with the upper yoke 5 divided in the direction of the track width. The present embodiment differs from the above described first embodiment in that the upper yoke 5 is divided into 6 portions in the direction of the track width with a high coercive force film 11b formed therebetween, resulting in a formation of a total of 5 high coercive force films.

According to the structure of the present embodiment, a more uniform weak magnetic field can be applied over the entire region of the MR element 1 to further improve facilitation of unification of magnetic domain of the MR element 1 even in the case of a wider track width.

Figure 10:
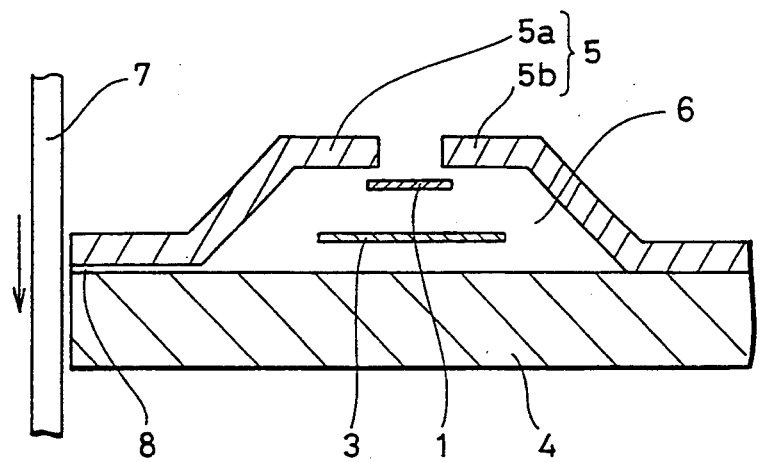
FIG. 10 schematically shows a sectional view of a conventional yoke type thin film magnetic head.
Figure 11:
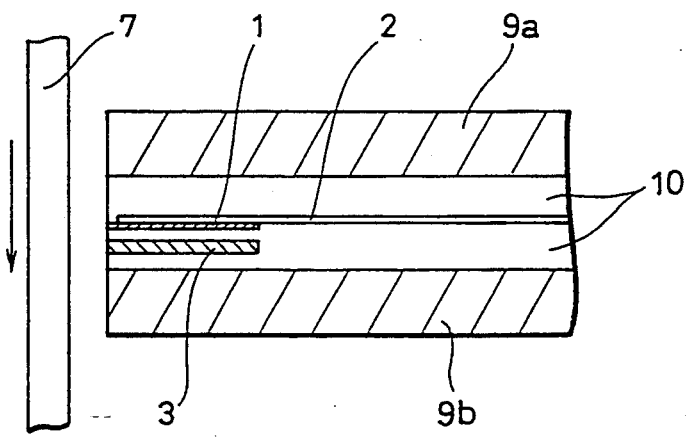
FIG. 11 schematically shows a sectional view of a conventional shield type thin film magnetic head.
Figure 12:
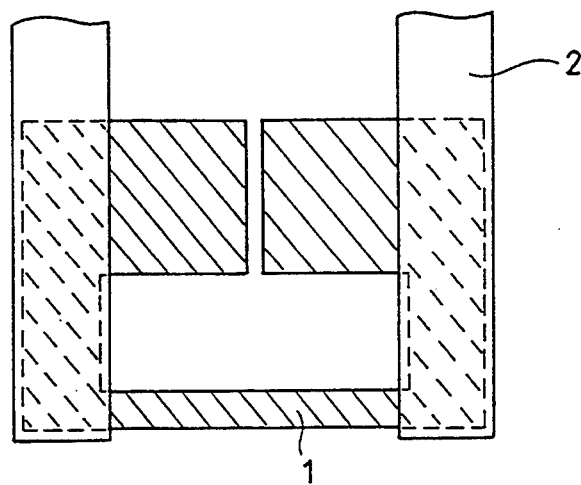
FIG. 12 shows an example of-a pattern where a MR element is magnetically confined as one method of carrying out unification of magnetic domain of a MR element.
Figure 13:
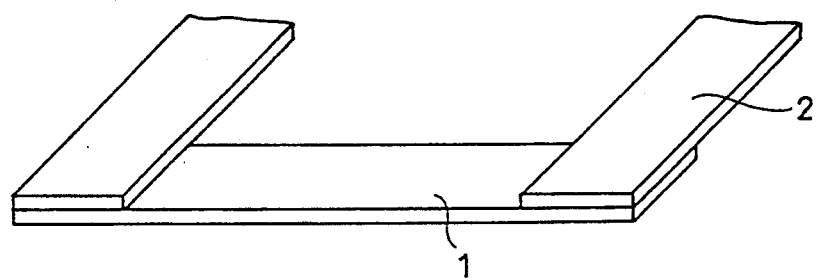
FIG. 13 is a perspective view of a conventional MR element having a structure in which a high coercive force film is not used.
Figure 14:
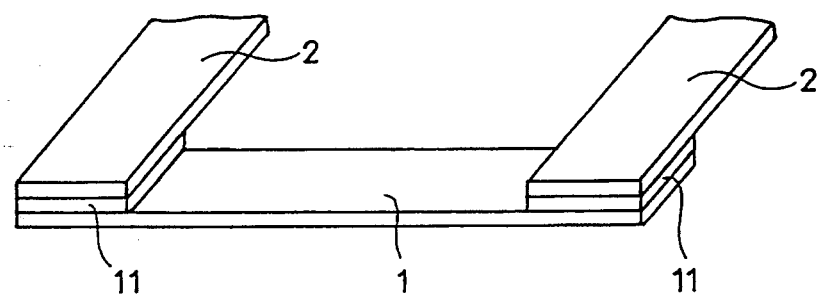
FIG. 14 is a perspective view of a conventional MR element in which a high coercive force film is formed only in the proximity of both ends.

The thin film magnetic head of the present embodiment is manufactured as follows. Because the sectional view of FIG. 3A taking along lines 25—25 is substantially equal to FIG. 10, FIG. 10 is also referred to in the description of the manufacturing method.

An insulating layer 6 of $SiO_2$ is formed on a lower yoke 4 which is a magnetic substrate such as Ni-Zn ferrite and Mn-Zn ferrite using a thin film formation method such as sputtering. A bias electrode 3 for applying a bias magnetic field to the MR element 1 is formed by E/B (Electron Beam) evaporation of an aluminum or Al-Cu film to be patterned to a predetermined configuration by photolithography. Ferromagnetic thin films such as of Ni-Fe serving as the MR element 1 are formed by evaporation. At the time of evaporation, an uniaxial anisotropy can be applied to the MR element 1 by applying a magnetic field of approximately 100 oersted. A portion of an insulating layer 6 such as of $SiO_2$ is provided for insulating the MR element 1. As described above, the easy magnetizing axis in the MR element 1 is inclined 5°–40° with respect to the stripe of the MR element taking into consideration the anisotropic dispersion of the MR element in order to shift the "jump" caused by switching to the side of the non-operating point.

The easy magnetizing axis of the MR element can be inclined by setting the wafer in an inclining manner so that the applied magnetic field is inclined 5°–40° with respect to the stripe direction of the MR element 1 in forming a Ni-Fe ferromagnetic substance thin film using evaporation and the like which becomes the MR element 1 on the wafer forming a thin film magnetic head. According to this method, the easy magnetizing axis of the MR element 1 is inclined in the specified 5°–40° direction with respect to the longitudinal direction of the MR element 1. In practice, the easy magnetizing axis of the Ni-Fe is locally inclined from a specified direction due to anisotropic dispersion. However, the switching noise can be shifted to the side of the non-operating point of the head by selecting an appropriate angle of inclining the wafer according to the magnitude of the anisotropic dispersion. By setting the MR element in the abovedescribed manner and carrying out etching to a predetermined configuration, the stripe of the MR element is patterned.

High coercive force films 11a and 11b of an Co-P plated film are formed using electroless plating method. The high coercive force films 11a and 11b are formed at a pitch of approximately 100 μm with respect to the length of 600 μm of the MR element 1 in the track width direction. The coercive force of the high coercive force films 11a and 11b is set to a degree where the magnetized direction is not inverted by a signal magnetic field or an external magnetic field.

It is considered that the signal magnetic field from a magnetic recording medium is at most 100 oersted and the external magnetic field is at most 100 oersted taking into consideration the influence of the magnetic field generated by a motor for driving a reel to which the magnetic recording medium is wound. Although a greater coercive force is desired, at least the degree of 300 oersted is sufficient. Although Co-P plated film is used as the high coercive force films 11a and 11b in the present embodiment, a plated film such as of Co-Ni-P may be used. Furthermore, a thin film such as of Co-Ni-Cr, Co-Cr, and Co-Pt can be formed with a sputtering method and the like, followed by patterning.

A MR element is originally an element used for converting the change of a magnetic field into a change in electrical resistance. Therefore, sensitivity as a magnetic head is degraded if the change in magnetization by a magnetic field is suppressed. A high coercive force film generally serves to apply a magnetic field in one direction. Because the magnetic field of the high coercive force film is intensive in the range of approximately 5 μm in the proximity of the high coercive force film, a change in the magnetization of a MR element will be suppressed. (Refer to Shiiba, Kira, et al. Institute of Electronics, Information and Communication Engineers of Japan, MR86-37, 1986). Therefore, the allocation of the high coercive force films at a short pitch is not desired on account of degradation in the sensitivity of the head.

In the conventional yoke type thin film magnetic head of FIGS. 16A and 16B in which the length of the MR element is 40 μm or 70 μm, the generation of Barkhausen noise was not particularly a great problem. Therefore, unification of magnetic domain of a MR element is carried out sufficiently in the case of a MR element having such a length. In the present embodiment, the high coercive force films 11a and 11b are arranged so that the length of the MR element is 90 μm. Although the sensitivity will be reduced by approximately 10%, such a degradation is not particularly a problem because the length of the original MR element is sufficient to result in a great output for the head.

A lead electrode 2 for providing a change in the resistance of the MR element 1 as a change in electrical signal is formed by an E/B evaporation of an aluminum or Al-Cu film to a film thickness of approximately 3000Å. This lead electrode is patterned to completely cover the high coercive force films 11a and 11b.

Then, SiO$_2$ is deposited and is taper etched to form the insulating film 6 of a trapezoidal configuration as shown in FIG. 10 using a RIE (Reactive Ion Etching). Then, a SiO$_2$ film or an Al$_2$O$_3$ film serving as a gap layer at the gap portion 8 is formed by sputtering or plasma CVD method.

Then, the upper yoke 5 of a ferromagnetic thin film such as Ni-Fe is formed by using a sputtering or plating method, followed by a patterning step of etching. The thickness of the ferromagnetic thin film is approximately 1500Å-1 $\mu$m. The patterned configuration of the upper yoke 5 is established so as not to be in contact with the high coercive force films 11a and 11b and the lead electrode 2. This is for the purpose of avoiding electrical shorting between the MR element 1 and the upper yoke 5 taking into consideration the thin insulating layer 6.

The insulating layer 6 such as of SiO$_2$ or Al$_2$O$_3$ is further formed as a protection film. The insulating layer 6 on pads 12 and 13 for wire bonding to provide a signal from the lead electrode 2 and the bias electrode 3 is etched by a RIE method to complete a thin film magnetic head shown in FIGS. 3A and 3B.

The generation of Barkhausen noise in the yoke type magnetoresistance effect type thin film magnetic head of the present embodiment was examined. The dimension of the MR element 1 is 600 $\mu$m in length, 10 $\mu$m in width, and approximately 300Å in film thickness, and each of the high coercive force films 11a and 11b formed of a Co-P plated film has a film thickness of 2000-4000Å with a coercive force Hc of approximately 400 oersted.

In the thin film magnetic head of the present embodiment, a yield of not less than 95% with the generation of Barkhausen noise as the standard was obtained similar to that where the length of MR element was approximately 40-70 $\mu$m. Considering that this value of yield includes generation of Barkhausen noise and the like due to external defect of the MR element such as dust adhering to the MR element or pattern defect, it can be said that there is hardly no generation of Barkhausen noise caused by magnetic characteristics of a MR element.

The generation of Barkhausen noise by applying an external magnetic field and the shifting of the switching noise to the side of the operating point in the thin film magnetic head of the present embodiment and the conventional thin film magnetic head shown in FIGS. 16A and 16B were examined. In the thin film magnetic head of the present invention, generation of Barkhausen noise or shifting of switching noise to the operation point was not observed even when an external-magnetic field of 210 oersted was applied. However, in the conventional type thin film magnetic head, generation of Barkhausen noise or shifting of the switching noise to the side of the operation point was observed when applying an external magnetic field of 140 oersted.

It is appreciated from the above results that the thin film magnetic head of the present embodiment is stable with respect to external magnetic field in comparison with the conventional type thin film magnetic head.

The third-fifth embodiments of the present invention will be described hereinafter with reference to FIGS. 5A-5C. The third-fifth embodiments are similar to the above described first and second embodiments in that the present invention is applied to a yoke type thin film magnetic head. The difference in these embodiments is that the upper yoke 5 is divided in the direction of the track width.

Figure 5A:
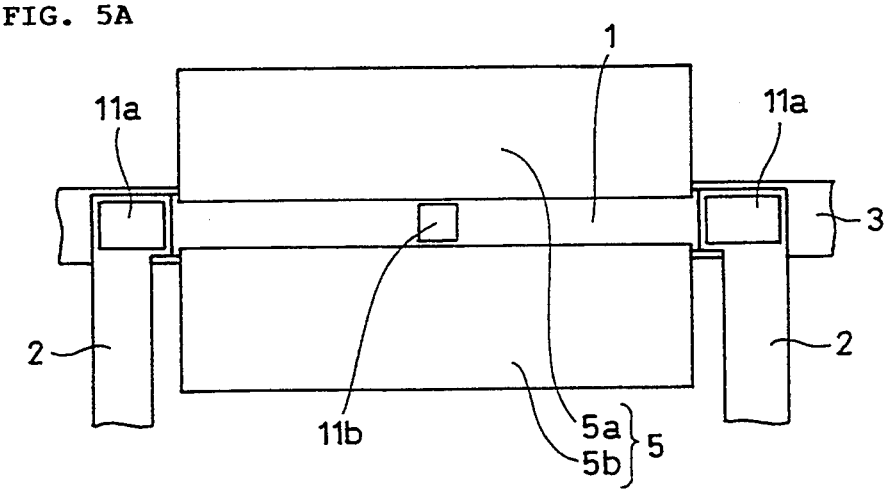
FIGS. 5A-5C are respectively plan views of a third-fifth embodiment of the present invention.
Figure 5B:
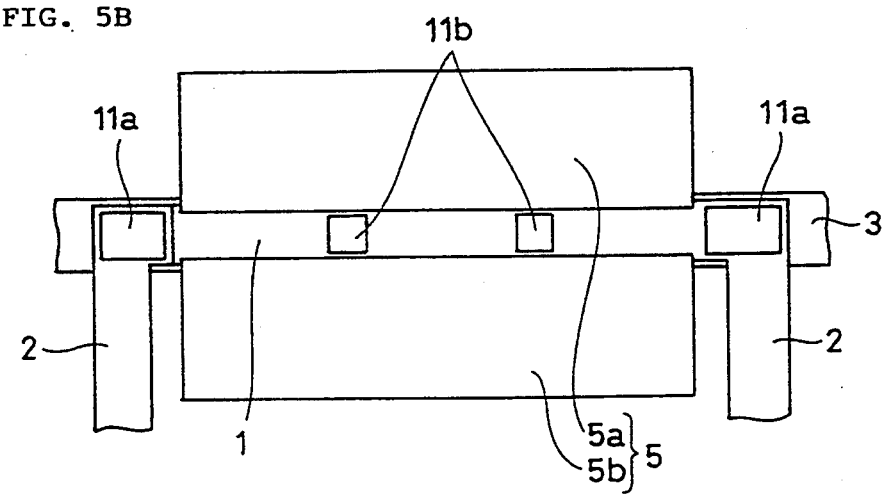
Figure 5C:
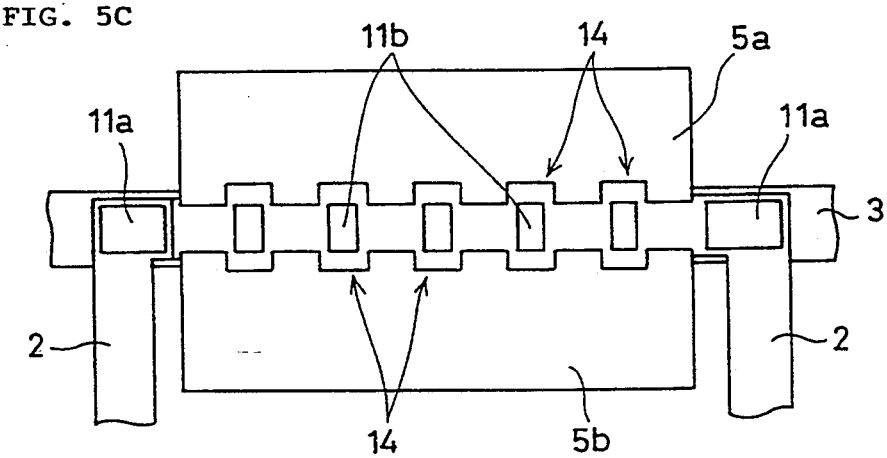

The third embodiment shown in FIG. 5A has the high coercive force film 11b formed only at the center of the MR element 1. The fourth embodiment shown in FIG. 5B has the high coercive force films 11b formed at two locations dividing the distance between the ends of the MR element 1 substantially into three equal portions. The fifth embodiment shown in FIG. 5C has the high coercive force film 11b formed at 5 locations as in the above-described second embodiment. The fifth embodiment has a notch 14 provided in the upper front yoke 5a and the upper back yoke 5b at respective positions opposing each high coercive force film 11b. The notch 14 is provided for the purpose of reducing the generation of the problems already described with reference to FIG. 2 in the case the upper yoke 5 is divided in the direction of the track width.

Although the suppression of the generation of Barkhausen noise in the third to fifth embodiments was not so significant as in the second embodiment, the Barkhausen noise was reduced in comparison with the conventional thin film magnetic head shown in FIG. 16A and 16B. Comparing the same in the third to fifth embodiment, the effect of Barkhausen noise suppression was most significant in the fifth embodiment and least significant in the third embodiment.

The advantage and disadvantage of the characteristics are considered in comparison with the case where the upper yoke 5 is divided in the direction of the track width as in the above described first and second embodiments, and in the case where the upper yoke 5 is not divided as in the third-fifth embodiments.

The difference in characteristics according to whether the upper yoke 5 is divided or not in the direction of the track width is caused by the difference in the magnetic domain configuration formed in the upper yoke 5. FIGS. 6A-6E show the configuration of magnetic domain of various configurations of stripes 21 refers to magnetic domains within the magnetic domain walls 22. The x, y dimensions of each stripe are shown in Table 1.

TABLE 1

| FIG. | 6A | 6B | 6C | 6D |
|------|-----|-----|-----|-----|
| x    | 600 | 100 | 40  | 100 |
| y    | 40  | 40  | 40  | 10  |

Figure 6A:
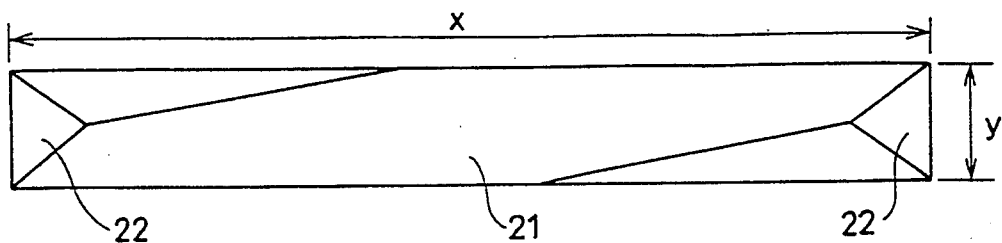
FIGS. 6A-6E are diagrams for describing the correlation between the stripe configuration of a MR element and the configuration of the formed magnetic domain.
Figure 6B:
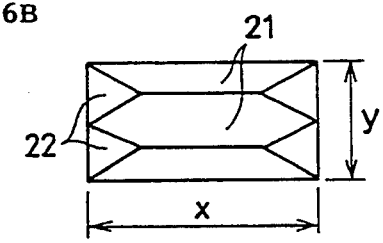
Figure 6C:
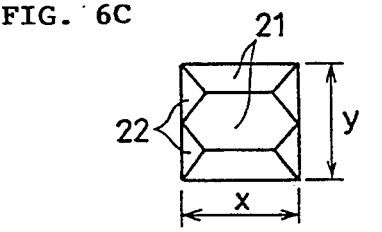
Figure 6D:
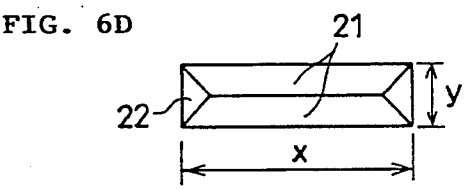

It can be appreciated from comparing FIGS. 6A-6D that a stripe having a great x length of 600 $\mu$m has the magnetic domain easily disturbed since the 180° magnetic domain wall does not easily become parallel to the stripe. A stripe not more than 100 $\mu$m in x length has an axis with no disturbance in magnetic domain formed even when the width y is approximately 10 $\mu$m as shown in FIG. 6D. Therefore, a thin film magnetic head having a stable magnetic domain can be formed by dividing the width of the upper yoke 5 in a narrow manner in the track width direction. From this standpoint, a stable magnetic head reduced in noise caused by disturbance of magnetic domain can be obtained by dividing the upper yoke 5 in the direction of the track width in a yoke type thin film magnetic head having a wide track width.

Figure 6E:
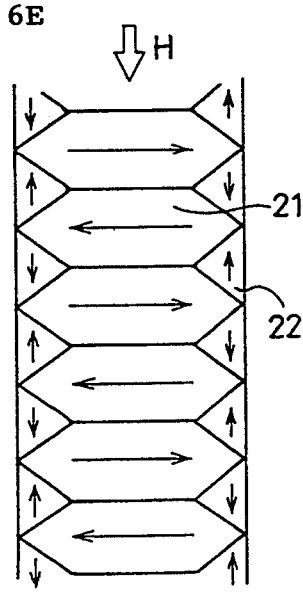

However, a stripe having a vertical width y relatively greater than the side width x results in a magnetic domain structure shown in FIG. 6E. Therefore, a plurality of 90° magnetic domain walls 22 are formed. Because the magnetization direction of the 90° magnetic domain wall 22 is parallel to the direction of the external magnetic field shown by arrow H in FIG. 6E, rotation in magnetization does not occur, so that a change in the external magnetic field H is not followed. The plurality of 90° magnetic domain walls 22 will become the cause of noise generation. It is therefore important to realize a configuration of an upper yoke 5 in which a 90° magnetic domain wall is not easily generated for the purpose of suppressing Barkhausen noise. From the foregoing, it is advantageous not to divide the upper yoke 5 in the direction of the track for suppressing Barkhausen noise.

It is necessary to determine an optimum yoke configuration according to the application of the thin film magnetic head in designing a thin film magnetic head from the standpoint of stabilization in the configuration of a 180° magnetic domain wall and reduction of a 90° magnetic domain wall.

Figure 7A:
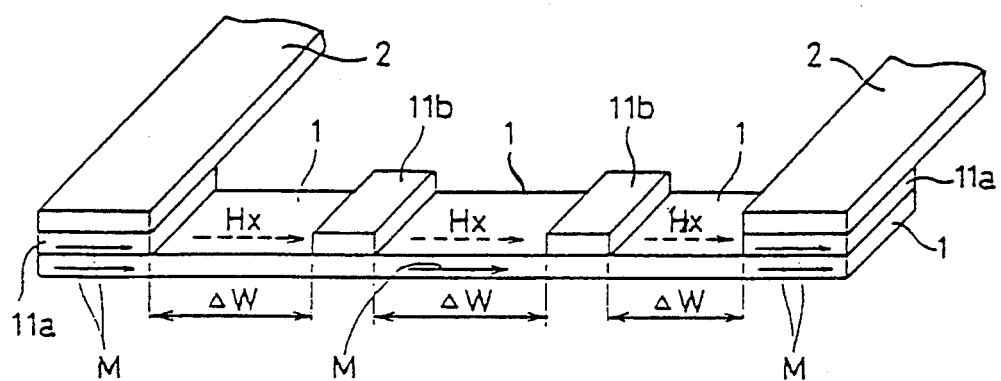
FIGS. 7A is a perspective view of a thin film magnetic head according to a sixth embodiment of the present invention showing only the proximity of a MR element.
Figure 7B:
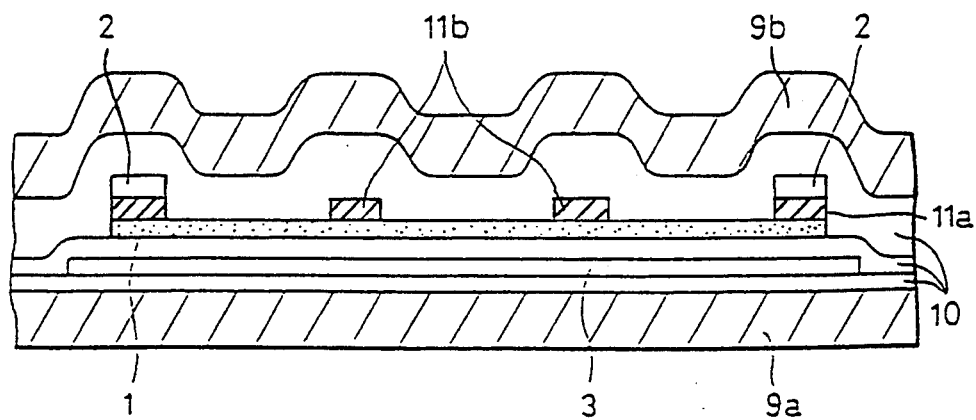
FIG. 7B is a sectional view of the thin film magnetic head of the sixth embodiment.
Figure 8:
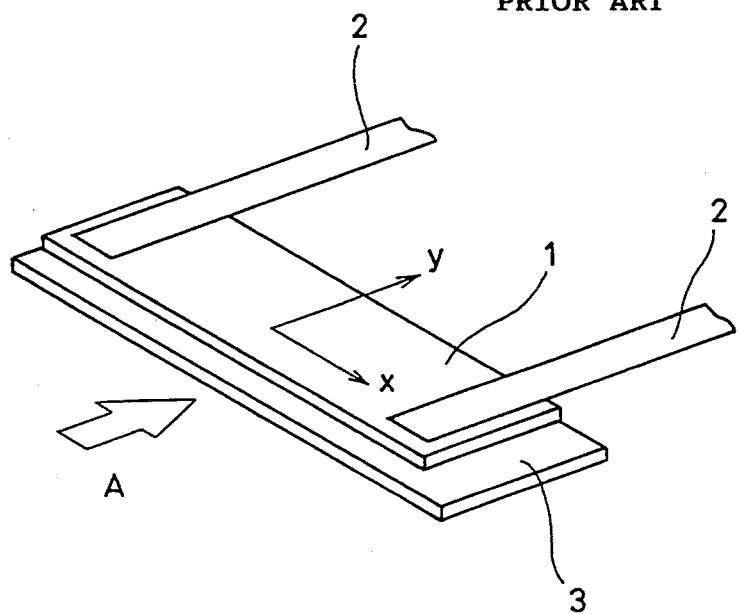
FIG. 8 is a perspective view of a conventional magnetoresistance effect type thin film magnetic head schematically showing a structure in the proximity of the MR element.

The sixth embodiment of the present invention will be described hereinafter with reference to FIGS. 7A and 7B. The present embodiment has the present invention applied to a shield type thin film magnetic head in comparison with the above described first to fifth embodiments in which the present invention is applied to a yoke type thin film magnetic head..

Figure 15A:
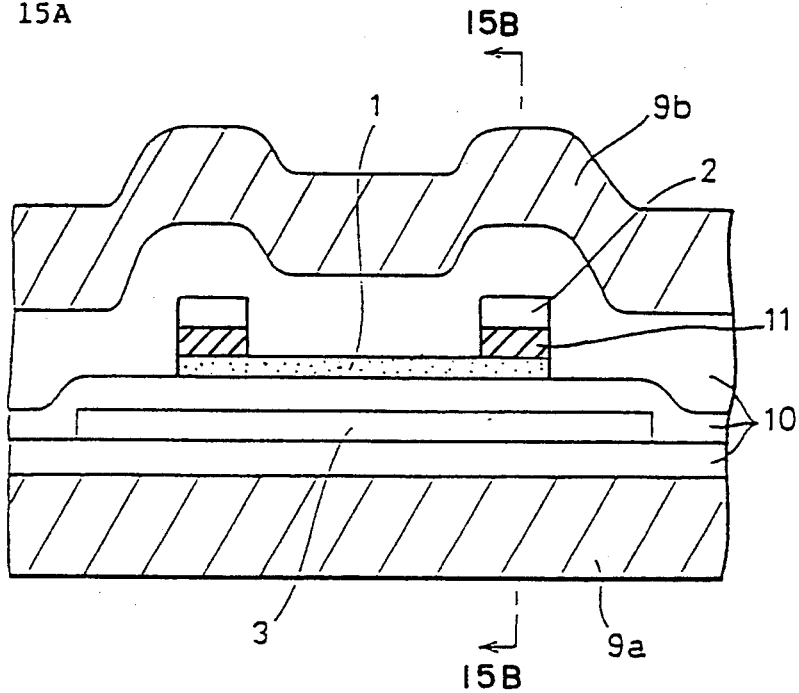
FIG. 15 shows a sectional view taken along a direction parallel to the direction of the track width of structure where a MR head having a high coercive force film formed only in the proximity of both ends of a MR element is applied to a shield type thin film magnetic head.
FIG. 15B shows a sectional view taken along line 15B–15B of FIG. 15A.
Figure 15B:
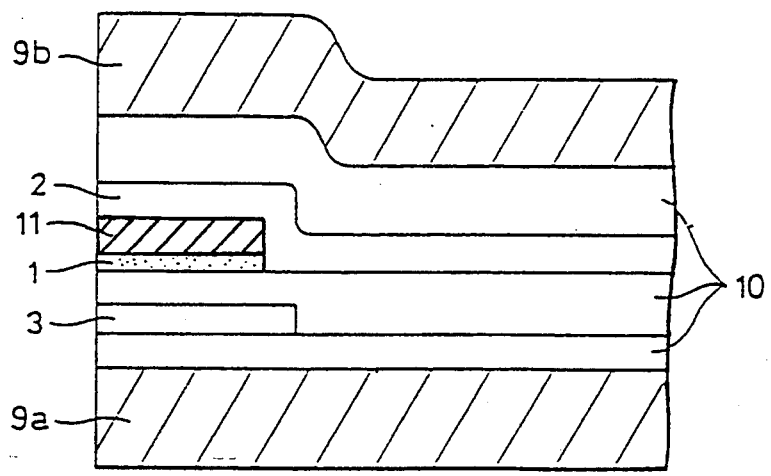

The present embodiment corresponds to a conventional head described with reference to FIGS. 15A and 15B. The present embodiment has the high coercive force films 11b formed at two positions substantially dividing into three the distance between the two ends of the MR element 1, in comparison with the conventional heads of FIGS. 15A and 15B where the high coercive force film 11 is formed only in the proximity of both ends of the MR element 1. The reference characters in FIGS. 7A and 7B are identical to those in the other drawings for the corresponding components, so that detailed description of the structure will not be repeated.

Figure 9A:
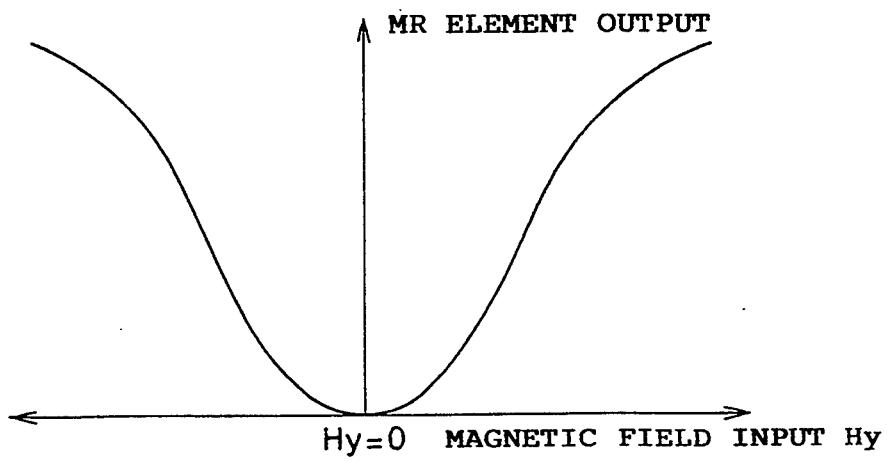
FIGS. 9A is an ideal magnetization curve of a MR element where no Barkhausen noise occurs.
Figure 9B:
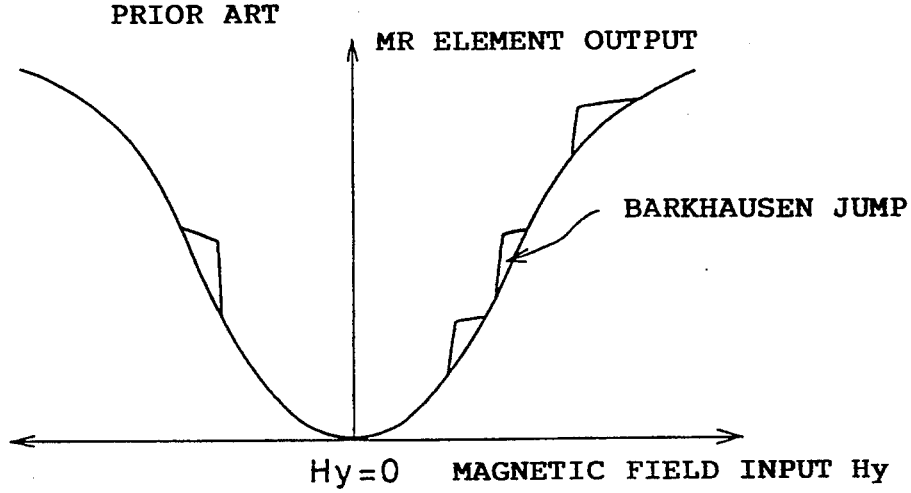
FIGS. 9B and 9C are magnetization curves of a MR element in which Barkhausen noise occurs.
Figure 9C:
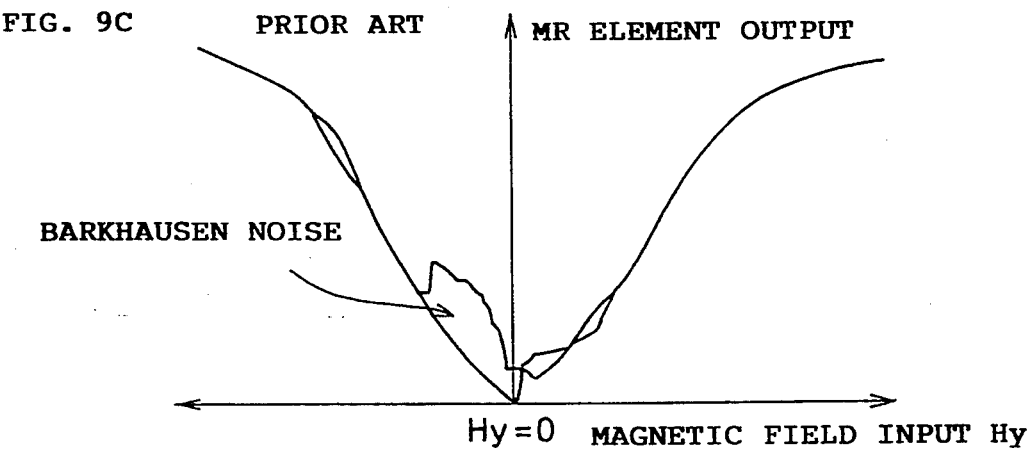

In the present embodiment, the distance ΔW between adjacent high coercive force films 11a and 11b is set to approximately 70 μm. Therefore, the MR element 1 functions as an ideal MR element having the direction of magnetization moved in the rotation mode. Therefore, an ideal quadratic functional output characteristic as shown in FIG. 9A is provided with respect to an input magnetic field with no Barkhausen noise in a MR magnetic head having a great track width, i.e. a long MR element 1.

Regarding the distance between the high coercive force films 11a and 11b, the inventors prepared various samples to examine the generation of Barkhausen noise. It was found that the probability of Barkhausen noise generation was increased when the ΔW became greater than 80 μm. With a distance of 70 μm, there was no noise generation in a 9-track MR head. When the high coercive force films 11a and 11b were arranged with a distance of 40 μm, no generation of noise was observed even with a MR head of 44 tracks.

From the foregoing, the concept of the present invention can be applied not only to a yoke type magnetoresistance effect type thin film head, but also to a shield type magnetoresistance effect type thin film magnetic head with the desired effect.

According to the above-described embodiments, the formation of high coercive force films not only in the proximity of both ends of a MR element in the longitudinal direction, but also at one or more predetermined positions between the ends allows an uniform weak magnetic field to be applied over the entire region of the MR element to facilitate unification of magnetic domain of a MR element.

As a result, a thin film magnetic head in which Barkhausen noise is not generated can be realized without changing the thickness of a high coercive force film even when the track width is great.

By dividing the upper yoke in the direction of the track width, stabilization in magnetization of the upper yoke is enabled, and reduction in yield caused by Barkhausen noise is suppressed even if the MR element is long. There is a further effect of suppressing Barkhausen noise generation caused by an external magnetic field or shifting of switching noise to the operating point.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A magnetoresistance effect type thin film magnetic head comprising:
   a magnetoresistive element including a metal ferromagnetic thin film having a uniaxial magnetic anisotropy, and having an electrical resistance changed according to a change in an applied signal magnetic field, said magnetoresistive element having an upper surface;
   a lead electrode means for conducting a sense current flow across the longitudinal ends of said magnetoresistive element for detecting a voltage change generated across said ends; and
   high coercive force films, magnetized in the longitudinal direction of said magnetoresistive element, for carrying out unification of magnetic domain in said magnetoresistive element by applying a weak magnetic field to said magnetoresistive element;
   wherein said high coercive force films are provided at said ends of said magnetoresistive element and at one or more predetermined positions between said ends, in direct contact with the upper surface of said magnetoresistive element and spaced along said magnetoresistive element in the longitudinal direction thereof,
   wherein a bias electrode is provided for applying a bias magnetic field to said magnetoresistive element,
   and wherein said thin film magnetic head further comprises a yoke forming a magnetic circuit for conducting a magnetic flux generated from a magnetic recording medium to said magnetoresistive element, said yoke being divided in the longitudinal direction of said magnetoresistive element so that a divided portion of said yoke is located at a region sandwiched between two adjacent high coercive force films, and divided portions of said yoke lie spaced along the longitudinal direction of said magnetoresistive element.

2. The magnetoresistance effect type thin film magnetic head according to claim 1, wherein high coercive force films are provided at a plurality of positions substantially equally dividing the distance between one pair of high coercive force films in the proximity of the ends of said magnetoresistive element.

3. The magnetoresistance effect type thin film magnetic head according to claim 1, wherein said yoke comprises
   a flat plate-shaped lower yoke, and
   an upper yoke provided above said lower yoke to form a gap portion at a front end portion with said lower yoke for introducing a magnetic flux from a magnetic recording medium, and divided into a front portion and a back portion above said magnetoresistive element.

4. The magnetoresistance effect type thin film magnetic head according to claim 3, wherein said upper yoke is divided in the direction of the track width above each said high coercive force film.

5. The magnetoresistance effect type thin film magnetic head according to claim 1, wherein a high coercive force film is provided at the middle of a region sandwiched by one pair of high coercive force films in the proximity of the ends of said magnetoresistive element.

* * * * *